UNITED STATES PATENT OFFICE.

JOHN M. GIBLIN, OF SHEBOYGAN, WISCONSIN.

FIRE-EXTINGUISHING COMPOUND.

SPECIFICATION forming part of Letters Patent No. 310,889, dated January 20, 1885.

Application filed August 4, 1884. (No specimens.)

*To all whom it may concern:*

Be it known that I, JOHN M. GIBLIN, of Sheboygan, in the county of Sheboygan, and in the State of Wisconsin, have invented certain new and useful Improvements in Fire-Extinguishing Compounds, &c.; and I do hereby declare that the following is a full, clear, and exact description thereof.

My invention relates to compounds for extinguishing fires, and will be more fully described hereinafter.

My present invention is designed for use in connection with a vessel of frangible material, substantially such as is described and claimed in my application for a patent for fire-extinguishers filed May 12, 1884, Serial No. 131,197, and which, briefly stated, consists in an outer vessel, of glass or other frangible material, having an opening at one end filled with an apertured cork, containing in turn the neck or stem of another vessel extending within the outer vessel, and adapted to contain an explosive agent and a fuse, whereby when the same is exploded it will break both vessels and scatter the chemical contents of the outer vessel upon the fire.

The nature of my present invention consists in making a "hand-grenade" fire-extinguisher containing sulphurous oxide (commonly known as "sulphurous acid") dissolved in an alkaline solution, and adapted to extinguish flame on breaking the containing-vessel.

Heretofore in that class of fire-extinguishers generally known as "hand-grenades" the usual effect of scattering the chemicals upon the flames has been to smother the fire, as ordinarily carbonic-acid gas is set free by the breaking of the grenade; but in the case of my present invention my chemicals are of such a nature that they operate in such manner as to take up the oxygen of the air surrounding the fire, which is thus instantly extinguished for want of oxygen to support it.

In carrying my invention into effect I take one of the described vessels and partially fill it with aqua-ammonia or other liquid alkali. I next generate sulphurous oxide by burning stick-sulphur or flowers of sulphur in a suitable furnace, and force the resulting gas through a coil of lead pipe surrounded by ice, to reduce the temperature of the gas. I then conduct the cooled gas by any suitable means into the vessel previously partly filled with the liquid alkali until the latter is thoroughly saturated with the sulphurous oxide. The aqua-ammonia, when the temperature of the sulphurous oxide is properly reduced, is capable of taking from one thousand to fifteen hundred times its own volume of sulphurous oxide. The sulphurous oxide and the ammonium hydrate have such a feeble affinity for each other that when thrown upon a fire or subjected to its heat (the inclosing-vessel being first broken, as described) the sulphurous oxide is liberated and rapidly unites with the oxygen of the air. The oxygen of the air being thus taken up by the sulphurous oxide, the fire is at once extinguished, as stated, for lack of oxygen. Furthermore, I do not confine myself to liquid alkalies alone, but may use any liquid capable of taking up sulphurous oxide.

Having thus described my invention, what I claim as new, and desire to secure by Letters Patent, is—

1. A fire-extinguishing compound consisting of sulphurous oxide dissolved in an ammoniacal liquid in a closed vessel, substantially as set forth.

2. A fire-extinguisher consisting of a tightly-closed vessel of frangible material containing sulphurous oxide dissolved in an alkaline liquid, substantially as set forth.

In testimony that I claim the foregoing I have hereunto set my hand, at Sheboygan, in the State of Wisconsin, in the presence of two witnesses.

JOHN M. GIBLIN.

Witnesses:
A. C. PRESCOTT,
ED. F. ZINNS.